United States Patent [19]
Nott

[11] 3,815,724
[45] June 11, 1974

[54] CONVEYOR BELT IDLER ASSEMBLY
[75] Inventor: Frank Joseph Nott, Blackrock, Australia
[73] Assignee: Production Equipment Limited, Huntingdale, Victoria, Australia
[22] Filed: Sept. 25, 1972
[21] Appl. No.: 291,559

[52] U.S. Cl. ............................. 198/192 R, 198/191
[51] Int. Cl. ............................................ B65g 15/08
[58] Field of Search ............. 198/191, 192 R, 192 A

[56] References Cited
UNITED STATES PATENTS
666,163 1/1901 Titus .............................. 198/192 X
2,707,047 4/1955 Ratzer ................................ 198/192

*Primary Examiner*—Evon C. Blunk
*Assistant Examiner*—Joseph E. Valenza

[57] ABSTRACT

Conveyor belt idler assembly including a base and a number of idler rollers rotatably mounted on individual shafts which are supported on the base in end to end relationship. The shafts are mounted on individual support frames which are releasably attached to the base so that rollers can be removed for servicing without moving the base.

4 Claims, 7 Drawing Figures

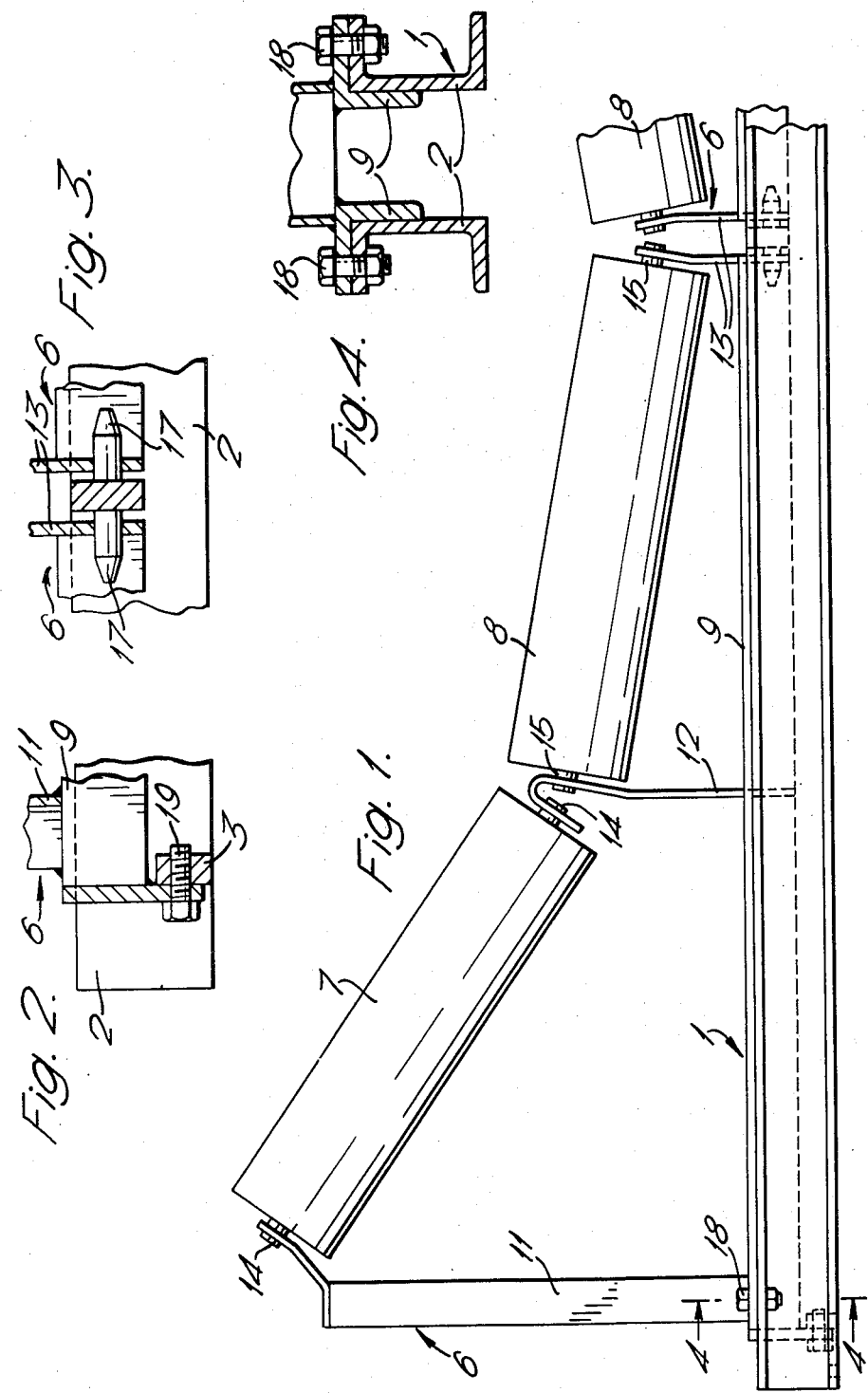

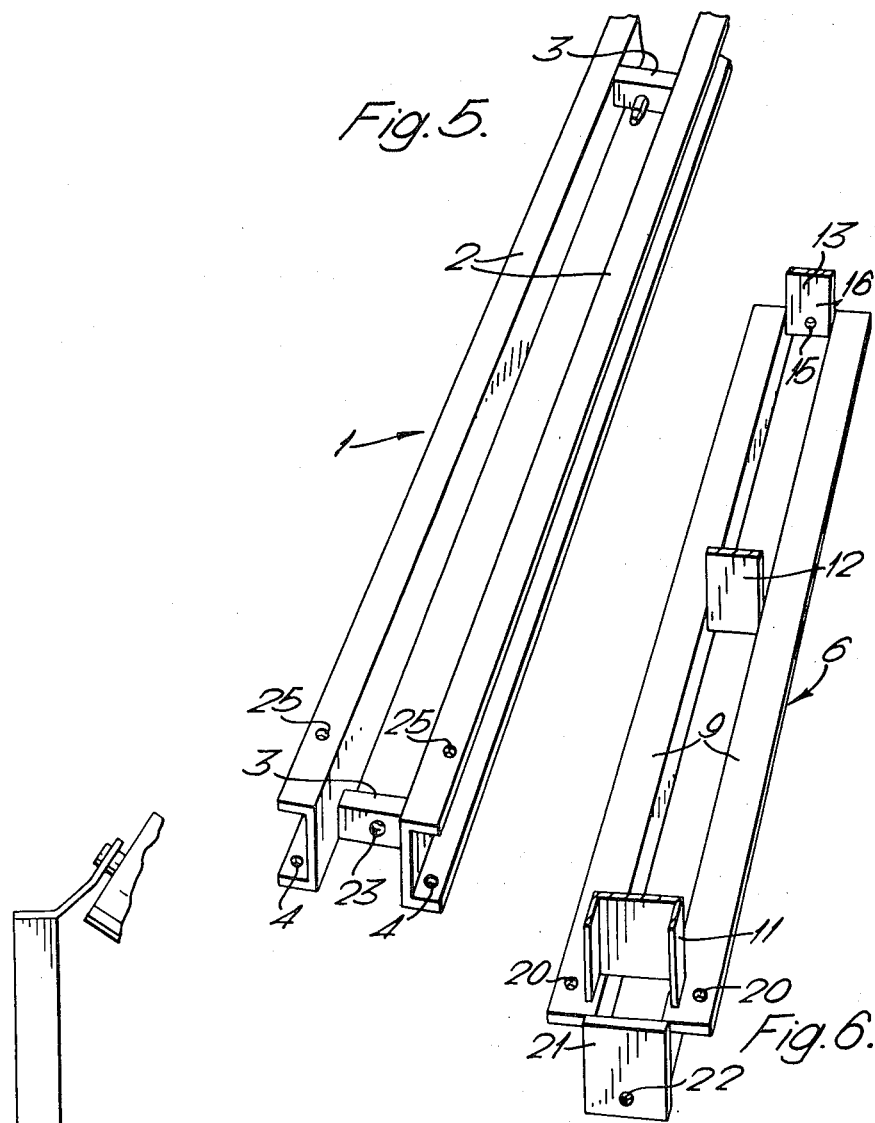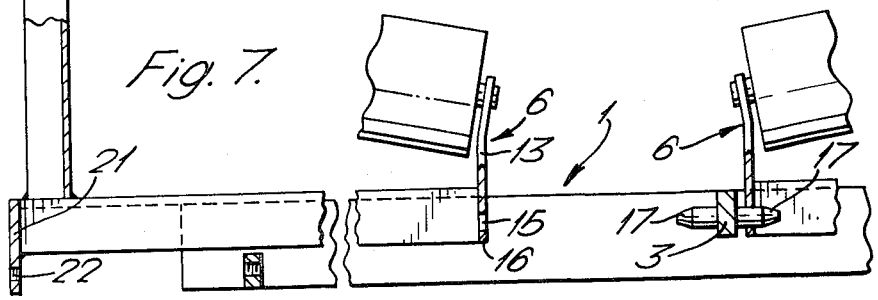

CONVEYOR BELT IDLER ASSEMBLY

BACKGROUND OF THE INVENTION

1. Field of Invention

This invention relates to conveyor belt idlers and more particularly to troughing idlers.

2. Description of Prior Art

Conveyor belt idlers generally comprise a plurality of idler rollers arranged in end to end relationship and mounted on a common base. In service the bases of the idlers supporting the conveyor belt are mounted at intervals along stringers of a conveyor support frame.

In a troughing idler the two outer end rollers are inclined upwardly and outwardly so that a conveyor belt supported thereon will adopt a markedly troughed configuration. There may be three idler rollers in which case the middle roller will be horizontal, but in some cases there may be four or more rollers in which case the intermediate rollers can also be inclined.

The present invention is concerned with problems which arise in replacing idler rollers during service. Because of the trough formation the idler rollers become keyed beneath the conveyor belt so that they cannot be simply removed. Conventionally the whole idler assembly must be swung down through 90° about an axis through the foot of the base and transverse to the conveyor so that the trough formation of rollers is horizontal and the individual rollers can then be removed. However, this is only feasible when the idlers are arranged at reasonably wide spacing. At many locations along a conveyor, at loading stations for example, idlers are arranged at very close spacing to provide adequate support and impact resistance so that in order to service one idler it is necessary to move several others as well. The present invention provides an idler assembly whereby this problem may be overcome.

SUMMARY OF THE INVENTION

According to the invention there is provided a conveyor belt idler assembly comprising a base, a plurality of support frames releasably mounted on the base, and a plurality of idler rollers rotatably mounted on individual shafts which are mounted on the support frames so as to be supported on the base in end to end relationship, each said shaft being supported by a single one of the support frames.

Preferably the base is an elongate structure extending longitudinally of the rollers and providing a track along which said support frames are slidable when released from attachment to the base.

Each of the support frames may support a plurality of roller shafts. In the case of a four roller idler for example, the rollers can be grouped in two pairs with one pair mounted on each of a pair of support frames.

In order that the invention may be more fully explained, one particular embodiment thereof will not be described in detail with reference to the accompanying now

BRIEF DESCRIPTION OF THE DRAWINGS

In the drawings,

FIG. 1 is an elevation of a little more than one half of an idler assembly constructed in accordance with the invention;

FIG. 2 is a vertical cross-section through a lower part of the assembly at one end of the assembly;

FIG. 3 is a vertical cross-section through a lower central part of the assembly;

FIG. 4 is a cross-section on the line 4—4 in FIG. 1;

FIG. 5 is a perspective view of part of the base of the assembly;

FIG. 6 is a perspective view of a roller mounting frame included in the assembly; and FIG. 7 is a broken elevation showing how the roller mounting frame can be withdrawn from the assembly.

DESCRIPTION OF SPECIFIC EMBODIMENT

The illustrated assembly comprises an elongate base 1 formed by a pair of elongate channel sections 2 which are arranged back to back and are held spaced apart by transverse spacer members 3. When the idler assembly is installed in a conveyor, base 1 is mounted on stringers of the conveyor support frame and is fastened to the stringers by bolts passed through holes 4 in the bottom flanges of the channels 2.

The four rollers are grouped in two pairs mounted one pair on each of a pair of support frames 6. The drawings show only a little more than one half of the idler assembly, the two halves being identical. Each support frame 6 comprises a pair of horizontal base elements in the form of angle sections 9. These elements carry longitudinally spaced uprights 11, 12, 13 which support the respective pair of rollers 7, 8. The shaft 14 of roller 7 is mounted between the end upright 11 and the intermediate upright 12 and the shaft 15 of the roller 8 is mounted between the intermediate upright 12 and the inner end upright 13.

The base angles 9 of frames 11 are spaced apart such that they will seat on the upper parts of the channels 2 so that the channels can serve as a track along which frames 11 can be slid into position before being fixed to the base. The inner uprights 13 of the support frames extend downwardly at 16 between the base angles 9, and are there provided with apertures 15 to receive a pair of guide pins 17 mounted on the transverse spacer 3 which is located centrally of the base.

At the outer end of frame 11 the angles 9 are drilled with holes 20 which, when the frame is correctly located in position, register with holes 25 in the upper flanges of channels 2 so that the frame can then be fastened to the base by bolts 18. An end plate 21 is fitted to the outer ends of the angles 9 and is drilled with a hole 27 to receive a further fastening bolt 19 which also extends through an opening 23 in the outer spacer 3 of the base 1.

As mentioned above the two ends of the idler assembly are identical. When it is necessary to service one or more of the rollers of the assembly, the respective support frame 11 is released from the base 1 by removal of the bolts 18, 19 and it can then be slid outwardly and horizontally along the base as shown in FIG. 7. It may thus be completely removed and the rollers attended to. On replacement, frame 11 is slid back along the base until its inner end engages and is located by the respective guide pin 17. It can then be forced firmly into position by tightening bolt 19 and the fastening is completed by application of bolts 18.

It will be appreciated that the illustrated idler assembly will enable any of the four rollers to be serviced without the need to move the main base 1. Since the frames 11 are removed by movement longitudinally of the base the adjacent idlers do not present any obstruction. Very rapid and convenient servicing is therefore possible. However, this particular construction has been advanced by way of example only and many modifications and variations are possible. For example, although the drawing shows plain cylindrical rollers the invention is particularly applicable to idlers fitted with grooved impact rollers since these must usually be installed at very close spacing. Although a four roller idler has been shown, the invention can readily be applied to idlers having different roller arrangements. For example, a five roller arrangement could be constructed wherein three of the rollers were mounted on one support frame and the other two on a second support frame. The troughing angles of the rollers can, of course, be varied to suit the service conditions. The form of the structural members in the base and support frames can also be varied. For example the base could be formed of angle sections rather than channels. It is accordingly to be understood that the invention is in no way limited to the illustrated arrangement and that many variations will fall within the scope of the appended claims.

I claim:

1. A conveyor belt troughing idler assembly comprising:
    an elongate base defining a horizontal slideway;
    a pair of roller support frames each having an elongate slide portion and a plurality of uprights which stand up from the slide portion and are spaced longitudinally of it, the roller support frames being disposed successively along the base with their slide portions engaged with and extending along the slideway;
    a plurality of roller shafts extending between and mounted on the upper ends of the uprights of said frames so as to be in end-to-end relationship and in troughed formation;
    a plurality of belt support idler rollers rotatably mounted one on each of the shafts to support a conveyor belt in troughed formation;
    slide stop means disposed on the base between the slide portions of the two roller support frames and engaging inner ends of the slide portions of said frames;
    interengaging pins and apertures provided on the stop means and inner ends of the slide portions of said frames restraining the inner ends of the slide portions against movement laterally of the slideway, said pins extending longitudinally of the slideway and of the slide portions of the frames; and
    releasable clamping means to clamp the outer ends of the roller support frames to the base;
    wherein each of said shafts is supported by a single one of the support frames, the support frames are movable on release of the clamping means horizontally outwardly along the slideway of the base without lifting of the support frames, and the shafts are divided between the support frames such that each frame can on release be moved outwardly along the slideway without any roller being keyed beneath the troughed belt.

2. A conveyor belt troughing idler assembly as claimed in claim 1, wherein the interengaging pins and apertures are comprised of a pair of pins projecting in mutually opposite directions from the stop means and a pair of pin receiving apertures in the inner ends of the slide portions of said roller support frames.

3. A conveyor belt troughing idler assembly as claimed in claim 2, wherein the base comprises a pair of parallel elongate members defining the slideway and transverse spacer members extending between said elongate base members to hold them apart, said transverse spacer members including a central spacer member constituting said stop means.

4. A conveyor belt troughing idler assembly comprising:
    an elongate base which includes a pair of parallel elongate base members and a plurality of transverse spacer members holding the parallel members apart, said parallel members having horizontal and vertical surfaces defining a horizontal slideway;
    a pair of roller support frames each having an elongate slide portion and a plurality of uprights which stand up from the slide portion and are spaced longitudinally of it, the slide portions of the roller support frames having horizontal and vertical surfaces engaged with the horizontal and vertical surfaces of the slideway, and the roller support frames being disposed successively along the slideway;
    a plurality of roller shafts extending between and mounted on the upper ends of the uprights of said frames so as to be in end-to-end relationship and in troughed formation;
    a plurality of belt support idler rollers rotatably mounted one on each of the shafts to support a conveyor belt in troughed formation;
    a pair of pins projecting in mutually opposite directions longitudinally of the slideway from a central one of said transverse spacer members located between the slide portions of the two roller support frames;
    a pair of apertures in the inner ends of the slide portions of the roller support frames which receive said pins to restrain the inner ends of the slide portions against movement laterally of the slideway; and
    clamping bolts to clamp the outer ends of the roller support frames to the base;
    wherein each of said shafts is supported by a single one of the support frames, the support frames are movable on release of the clamping bolts horizontally outwardly along the slideway of the base without lifting of the support frames and the shafts are divided between the support frames such that each frame can on release be moved outwardly along the slideway without any roller being keyed beneath the troughed belt.

* * * * *